(12) United States Patent
Gao et al.

(10) Patent No.: US 9,021,801 B2
(45) Date of Patent: May 5, 2015

(54) COMPENSATING FOR INCOMPLETE REVERSAL IN MECHANISMS INCORPORATING SHAPE MEMORY ALLOY WIRE

(75) Inventors: Xiujie Gao, Troy, MI (US); Geoffrey P. McKnight, Los Angeles, CA (US); Guillermo A. Herrera, Winnetka, CA (US); Christopher B Churchill, Ventura, CA (US); Nancy L. Johnson, Northville, MI (US); Alan L. Browne, Grosse Pointe, MI (US); Peter Maxwell Sarosi, Ferndale, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 13/600,337

(22) Filed: Aug. 31, 2012

(65) Prior Publication Data

US 2014/0060036 A1 Mar. 6, 2014

(51) Int. Cl.
*F01B 29/10* (2006.01)
*F02G 1/04* (2006.01)
*F01P 7/10* (2006.01)
*F03G 7/06* (2006.01)

(52) U.S. Cl.
CPC .... *F01P 7/10* (2013.01); *F03G 7/06* (2013.01)

(58) Field of Classification Search
CPC ........................................................ F03G 7/065
USPC .................................................... 60/527–529
See application file for complete search history.

(56) References Cited

U.S. PATENT DOCUMENTS

| | | | | |
|---|---|---|---|---|
| 4,490,975 A * | 1/1985 | Yaeger et al. | .................... | 60/527 |
| 4,559,512 A * | 12/1985 | Yaeger et al. | ................. | 337/140 |
| 7,686,382 B2 | 3/2010 | Rober et al. | | |
| 7,866,737 B2 * | 1/2011 | Browne et al. | ............. | 296/193.1 |
| 2006/0235424 A1 | 10/2006 | Vitale et al. | | |
| 2011/0154817 A1 * | 6/2011 | Zimmer et al. | ................. | 60/528 |

* cited by examiner

*Primary Examiner* — Christopher Jetton
(74) *Attorney, Agent, or Firm* — Reising Ethington P.C.

(57) ABSTRACT

Shape memory alloy (SMA) actuating elements are commonly simpler and of lower mass than alternative actuator designs and may find particular application in the transportation industry. Such SMA-powered devices are usually reliable and long-lived but the phase transformations which occur in the SMA alloy and are responsible for its utility are not totally reversible. This irreversibility, a consequence of irrecoverable strain, may progressively degrade the long-term actuator performance as the irrecoverable strain accumulates over many operating cycles. Methods and devices for compensating for these effects and extending the useful cycle life of SMA actuators are described.

20 Claims, 7 Drawing Sheets

COMPENSATING FOR INCOMPLETE REVERSAL IN MECHANISMS INCORPORATING SHAPE MEMORY ALLOY WIRE

TECHNICAL FIELD

Many mechanical devices incorporate mechanisms designed to repeatedly cycle between a first configuration and a second configuration. One means of accomplishing these actions is to use mechanisms which incorporate an elongated shape memory alloy element, such as a wire, as the mechanical actuating device. But such wires or other elements may undergo undesired extension and reduced performance under extensive use. This invention pertains to methods of automatically restoring device performance by compensating for any in-use increase in the length of an elongated shape memory alloy member.

BACKGROUND OF THE INVENTION

Many mechanical devices may adopt one of two substantially fixed configurations and are repeatedly cycled between two operating positions. These positions may be designated as off/on or open/closed or extended/retracted or engaged/disengaged or some similar terminology. Exemplary automotive examples of such devices include a retractable air dam, latches and clutches among others. Other mechanical devices may adopt, in addition to 'open' and 'closed' positions a range of positions intermediate between these limits. Exemplary automotive examples of such devices are a set of louvers for controlled passage of air which may be 'closed', 'open' 50% open, 85% open etc., a fluid flow valve, rearview or side mirrors or visors or shades. Both types of devices may be operated using mechanisms incorporating an elongated shape memory alloy (SMA) actuator.

SMA actuated devices find particular application in vehicles where their low mass coupled with their reliability and relative simplicity makes them attractive replacements for electromechanical devices such as electric solenoids or motors. This is particularly so when the stroke or range of operation of the device is limited.

SMA actuators rely for their operation on the useful property of SMA alloys that they may forcibly shrink or shorten in length when heated. The force generated by such SMAs is significant and may be powerful enough to operate a device even when some mechanical or other resistance is encountered.

A device may incorporate various components and mechanisms to achieve a desired range of motions but the key components of the SMA actuator are a preselected length of SMA alloy arranged in series with a biasing element which creates a biasing force to reset the device and prepares it for re-use. A common form of a biasing element is a spring but other approaches such as dead weights or hydraulic cylinders, among others, may be used. The SMA may suitably be in the form of wire, tape, chain, cable, braid or any other elongated form of SMA capable of sustaining a tensile load. The spring is commonly attached at one end to a support and at its other end to one end of the SMA wire, with the second end of the SMA wire attached to a second support. The workpiece or component to be moved is positioned between the wire and the spring. Mechanical stops may be employed to enforce only an intended range of motion.

SMAs derive their useful properties from their ability to exist in two crystalline phases, a first, lower modulus, phase stable at lower temperatures, and a higher modulus, higher temperature phase of a different crystal structure. The transition from one phase to the other may, by appropriate choice of alloy system, alloy composition, heat treatment or applied stress, be selected to occur over a temperature span of from −100° C. up to about +150° C. or so. But, many useful SMA alloys exist in their lower temperature or martensite phase, at, or slightly above, about 25° C. or so, and transform to their higher temperature, or austenite, phase at temperatures ranging from about 60°-80° C. or so. These characteristics substantially assure that the SMA will be in its martensite phase at ambient temperature but may be readily transformed to its austenite phase with only modest heating.

SMA actuator wires, or similar, are first shaped, in their austenite phase to the desired form, then cooled to ambient temperature, resulting in their adopting the martensite crystal structure. While in their martensite phase the wire is stretched and deformed to its intended predetermined length. The deformation exceeds the maximum allowable elastic strain which may be imposed on the actuator, and is often termed pseudo-plastic deformation. These pseudo-plastically-deformed martensite wires are in the appropriate starting condition for the actuator.

Generally the stretch or strain, that is, the change in length of the wire divided by its original or base length, applied during such pseudo-plastic deformation does not exceed 7% and more commonly may be 5% or less. Importantly, the base length, to which all length changes are referred, is the length of the wire in its high temperature, austenite phase.

After being suitably deformed in their martensite phase, the SMA wires may, when heated and transformed to austenite, spontaneously revert to their original undeformed shape. In changing shape, the wire will contract by an amount substantially equal to the pseudo-plastic strain previously applied when it was in its martensite phase. So, by suitable choice of wire length, any desired displacement may be achieved. As an example, a 10 inch or so length of wire, prestrained to about 5% strain, may enable a total displacement of about one-half inch or so. The force applied during heating may be increased by increasing the wire diameter, or, more commonly, to facilitate prompt cooling of the device, by arranging multiple smaller diameter wires in parallel.

Actuator action may be reversed by stopping heating and allowing the wire to cool to about ambient temperature and revert to its martensite crystal structure. During cooling the SMA wire will not spontaneously change its length to its initial deformed length but, in its martensite phase, it may be readily stretched again to its initial predetermined length. The spring, or other biasing element, in series with the SMA wire is selected to deform the SMA when the SMA is in its less strong martensite phase. So, on cooling, when the austenite wire reverts to its martensite phase it is stretched, by the spring, to its initial length so that the cycle may be repeated. Provided the transition in crystal structure is fully reversible this cycle of extending and contracting the wire by application of suitable stimulus may continue indefinitely.

In practice however, the phase transitions and the accompanying cyclic length are not completely reversible, and some irrecoverable deformation occurs. These cycle-by-cycle irreversibilities accumulate over repeated cycles to permanently extend the wire. This permanent extension of the wire introduces slack into the initially-taut wire and both reduces the stroke obtainable from a device and renders its operation non-linear. These effects may be sufficient to impair the operation of the device or render it ineffective. In such a circumstance the device may need to be replaced.

There is therefore a need to mitigate the effects of irreversible transformation of SMA actuators in devices to extend the useful cycle life of such devices.

SUMMARY OF THE INVENTION

This invention is directed to mechanical tensioner devices for attachment to the SMA wire and adapted to automatically sense and remove the effects of any irrecoverable deformation which has occurred in the SMA wire. The irrecoverable deformation which results from some combination of irreversible deformation processes will extend the length of the SMA wire and develop slack in an initially-tensioned wire. In operation the tensioner will readily displace the SMA wire in a direction suitable for re-tensioning the SMA wire while opposing any motion in the opposite or reverse direction which would introduce yet further slack in the SMA wire. The tensioner may be capable of continuous motion or of motion in only discrete increments. Thus slack may be removed substantially continuously or allowed to first accumulate to some preset amount and only then be removed. The tensioner may be powered by any suitable power source including, for example an electric motor, but power is preferably provided by a stored energy device, for example, a spring in one its many variants.

The spring may apply tension to the SMA and may be attached directly to the SMA wire, or more typically to a sleeve, crimped or otherwise permanently secured to the SMA wire. In some embodiments, the tensioner may be a two piece device. In these embodiments, one piece of the tensioner is attached to the SMA wire on one end and to the spring on an opposing end. The second piece is attached to a support. The spring will displace the two tensioner pieces relative to one another while simultaneously tensioning the SMA. The strength of the tensioner spring should be chosen to freely move the tensioner pieces and modestly tension the SMA wire but should not be capable of excessively deforming the SMA wire. In such two-piece embodiments the first and second tensioner pieces are constructed and arranged to offer minimal resistance to motion under the urging of the spring but oppose motion in the opposing direction. Thus, once tensioned, the SMA wire will retain the applied tension until further irrecoverable deformation accumulates after additional use.

In a first embodiment the first and second tensioner pieces are like-shaped racks with asymmetric teeth. The racks are arranged in opposition, vertically and horizontally so that their teeth remain in contact and engaged. When moved in a first direction the rack teeth will engage and interfere and when moved in the opposing direction the tooth ramps of each rack will slide over one another to permit relative motion of the racks. Either rack may be positioned between, and connected at its ends, to the SMA wire and a spring. The remaining rack is permanently attached to a suitable support.

In a second embodiment, the first and second tensioner pieces are a toothed rack and a ratchet adapted to engage the rack. The rack may be attached to a support and the ratchet may be incorporated into a holder or frame which is attached, on one end, to the SMA wire and, on the other end to a spring. The ratchet may pivot about a pin in a manner which permits it to retract into its holder or frame such that it will not engage with the rack. Thus, when moved in a first direction, the tooth ramp of the rack will urge the ratchet to rotate about the pin and into a configuration which will avoid engagement with the teeth of the rack. Under relative motion in the opposite direction the rack, unable to rotate, will remain deployed and engage the rack and prevent further motion.

In a third embodiment, a hold open washer may be used to maintain tension in the SMA wire. By attaching the SMA wire on a tab, or outwardly-extending angled section, of the generally annular washer, a moment is created whenever the SMA wire applies tension to the washer. Such tension causes the washer, whose inner annular surface is in sliding engagement with a post, to tilt or pivot and enable the washer to engage the post. When tension is relieved, the washer rotates out of engagement with the post and may be displaced and slid along the post by a spring, to once again tension the SMA wire, rotate the washer, and secure the SMA wire in its tensioned state.

In a fourth embodiment a spring is attached to the end of the SMA wire and the wire is secured between a pair of releasable grippers. In this embodiment only a portion of the wire length, the portion between the grippers and the workpiece, is active in operating the device. When the grippers are released, the spring may re-tension the entire length of SMA wire so that when the grippers re-engage or re-grip the wire, the active length of the wire is similarly re-tensioned. In this embodiment, unlike those previously described, re-tensioning does not inherently occur during cycling of the SMA actuator. Rather re-tensioning is a process divorced from the normal operation of the actuator and requiring the additional operations of disengaging and re-engaging the grippers from the wire. Thus re-tensioning must be programmed or scheduled, but may be conducted as frequently as required, including up to after every cycle.

In a fifth embodiment one end of the wire is secured in a threaded plug which engages a threaded socket secured to a fixed support permitting rotational motion while preventing motion in other directions. By rotating the socket using a helical coil spring the socket may be advanced into the plug to tension the wire.

A further embodiment uses motors and brakes, to tension an SMA wire supported on pulleys, and further, provides a spool for storage of additional wire. This embodiment further enables refreshing the complete length of SMA wire with new and unused wire if re-tensioning of the SMA wire is so frequent and extensive that it exhausts the capabilities of the wire.

Other objects and advantages of practices of the invention will be apparent from the following descriptions of illustrative embodiments of the invention. In some of these descriptions reference is made to drawing figures which are described in the following section of this specification.

BRIEF DESCRIPTION OF THE DRAWINGS

In FIG. 2A the device is in its undeployed or 'closed' configuration and serves to effectively block passage of air through the louvers. In FIG. 2B the louvers are rotated to their 'open' position enabling generally free passage of air.

DESCRIPTION OF PREFERRED EMBODIMENTS

The following description of the embodiment(s) is merely exemplary in nature and is not intended to limit the invention, its application, or uses.

Automobiles may use shape memory alloy-actuated, or -powered, devices to operate devices which require a limited range of linear or rotary motion. Such devices are relatively simple and of low mass making them attractive substitutes for fractional horsepower electric motors or similar electromechanical devices. The devices take advantage of the ability of such shape memory alloys to repeatedly cycle between two extreme positions as, for example in a retractable air dam, a latch and a clutch, or to repeatedly cycle over a range of positions intermediate between predetermined limits, as for example in an adjustable louver array, a rearview or side mirror or a sun visor.

Shape memory alloys (SMAs) are particular alloys which undergo substantially reversible transformation between two crystal phases—a low temperature phase known as martensite and a high temperature phase known as austenite. The particular phase transformation temperature varies with alloy system, but generally ranges from between about −100° C. to about +150° C. or so. Shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn but only a few of these alloys are commercially available. Nitinol, an alloy of nickel and titanium in near-equiatomic proportion, enjoys the widest use.

In many applications the SMA is preformed into a wire or similar elongated form such as a tape, chain, cable and braid among others, but, for convenience, only the term wire will be used in subsequent sections. Associated with the change in crystal structure experienced by SMAs is a change in shape, most obviously manifested as a change in the length of the wire. The magnitude of this change in length is characteristic of the specific alloy system and may range up to about 7% or so in some systems such as the Ni—Ti system. As the SMA element seeks to change its length it may apply appreciable force to overcome any mechanical drag or opposition. With appropriate design, mechanical devices may be fabricated to harness and utilize the force resulting from transformation to operate or actuate mechanisms or similar mechanical devices.

Figure 1A:
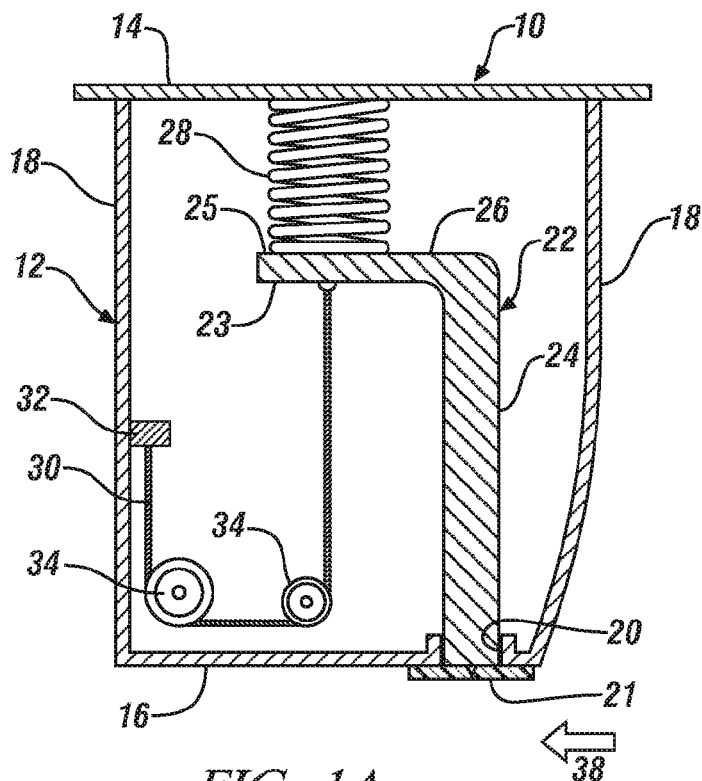
FIGS. 1A and 1B show, in section, an SMA device for deployment of a vehicle air dam.
Figure 1B:
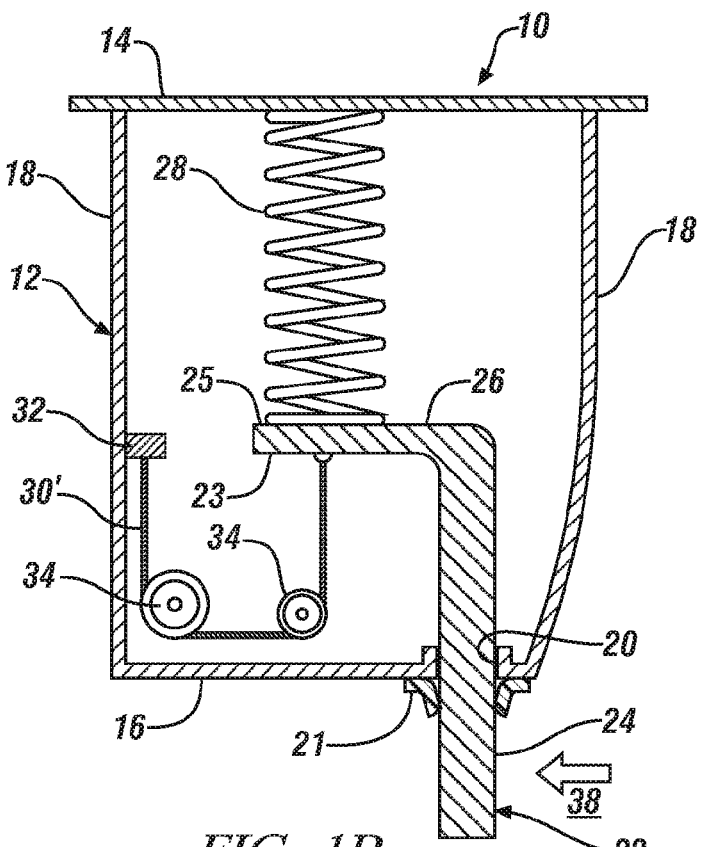

FIGS. 1A and 1B show a representative example of a linear mechanical device representative of one automotive application and intended to cycle between fixed end-points, an SMA-deployed retractable air dam. Air dams are generally fitted beneath the front bumper of an automobile and extend into the under-vehicle airflow. Air dams may improve the handling and control of the motor vehicle, increase fuel economy, and also improve the routing of air flow for cooling/heat exchange in the vehicle engine compartment. The effectiveness of air dams is greatest at higher vehicle speeds and when they extend almost to the roadway but this configuration renders them most vulnerable to impact with roadway obstacles even at low speeds. Thus the geometry of fixed air dams necessarily represents a compromise between aerodynamic effectiveness and avoiding collision of the air dam with obstacles or road hazards. A better compromise may be made by using a retractable air dam. Such a retractable air dam offers the opportunity of deploying the air dam only at high speed and retracting the air dam at low speeds to minimize the likelihood of a damaging air dam collision when the air dam is least effective.

In the sectional view of FIG. 1A the air dam system 10 includes air dam 22, housing 12 and an SMA actuation system comprising SMA wire 30. The air dam is shown in its retracted position located out of airflow 38. Air dam 22 is generally L-shaped with a longer portion 24 intended for insertion into air flow 38. The shorter section 26 of air dam 22 has opposing surfaces 23, 25 and is mechanically attached to the SMA wire and responsive to its movement. Surface 23 is secured to an end of SMA wire 30 and surface 25 to an end of tension spring 28. The opposing end of spring 28 is attached to the underside of cover 14. SMA wire 30 is secured at its other end at mount 32 and routed around pulleys 34 to enable a more compact device. The device is contained within housing 12 formed of opposing, generally vertical walls 18, generally horizontal cover 14 and opposing closure 16. Closure 16 includes a slotted opening 20 with compliant flap seals 21 which sealingly engage to deny access of road splash and debris to housing 12 when air dam 22 is retracted.

In FIG. 1B, SMA wire 30 has been actuated, preferably by utilizing the mechanical connectors on the wire ends as electrical connectors and passing an electric current along the length of the wire (details not shown). Wire 30, prior to heating of the wire by the electric current, or other applicable means, was in its low temperature, lower strength martensite state. When wire 30 is in its low modulus, martensite state, it may be deformed and elongated by spring 28, retracting air dam 22 into housing 12 as shown in FIG. 1A. Heating SMA wire 30 results in its transformation into its higher strength austenite state, shown as wire 30' in FIG. 1B. Associated with its transformation to higher strength austenite, wire 30 seeks to shrink to a length appropriate to austenite wire 30'. As it does so it applies sufficient force to overcome the force exerted by spring 28, causing spring 28 to extend and forcing portion 24 of air dam 22 through opening 20 where it extends into airflow 38. Seals 21 are deflected into contact with the opposing surfaces of portion 24 of the air dam, so that they may continue to exclude moisture and debris from housing 12.

On cessation of heating, wire 30' will cool and transform to martensite wire 30. The lower strength martensite wire 30 may be deformed by spring 28, enabling spring 28 to contract and, because of its connection to surface 25 of air dam 22, retract air dam 22 within housing 12 as shown at FIG. 1A.

In this application, the SMA actuator mechanism is intended to operate in fixed displacement mode so that the air dam will extend beyond the housing by some predetermined extension. This, relatively simple, operating scheme may be implemented, for example, by progressively ramping the applied current passed through the wire until the design displacement is achieved and then applying only a terminal current to maintain the desired deployment. Similar mechanisms may be used to operate other devices including latches and clutches.

Figure 2A:
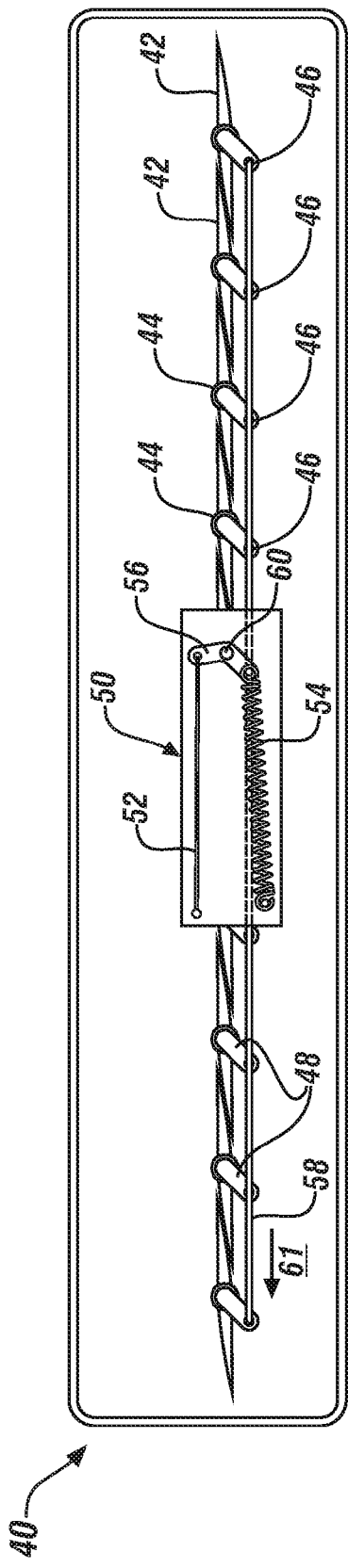
FIGS. 2A and 2B show, in top view, a louver device for controlled flow of air.
Figure 2B:
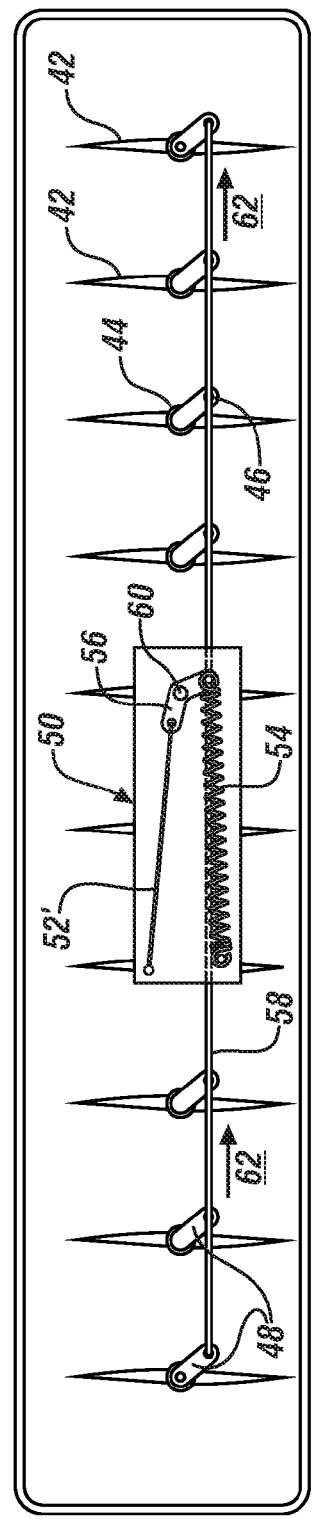

An alternative application of an SMA actuator is shown in FIGS. 2A and 2B. In this application, a plurality of louvers 42, arranged for control of airflow, are connected to a common bar 58 by linkages 48 at pivots 46. In turn, bell crank 56 is also connected to bar 58 and SMA wire 52 and spring 54 arranged in opposition on its respective arms. In FIG. 2A the louvers are depicted in their closed or 'airflow blocking' configuration. SMA wire 52 is in its martensite phase and is stretched to a predetermined extent. In the configuration shown it may be noted that abutting louvers interfere with one another when in the closed position and so limit or control the extent of stretch. For other louver geometries, where such interference may not occur, a separate stop (not shown) may be used to limit stretch. In FIG. 2A SMA actuator 50 is shown with SMA wire 52 in its martensite phase and so capable of being stretched by spring 54. Under the influence of spring 54, bar 58 is moved in the direction of arrow 61, orienting link 48 at approximately a 2 o'clock position and closing the louvers. On heating and actuating SMA wire 52', as shown in FIG. 2B, bell crank 56 is rotated counterclockwise about pivot 60 displacing rack 58 in the direction of arrow 62 and so rotating link 48 counterclockwise about its pivot 46 to an approximately 10 o'clock position. As link 48 rotates it, in turn drives each of louvers 42 to pivot about respective pivots 44 and orienting the louvers in their 'open' position.

It will be appreciated that because the transformation from martensite to austenite occurs over a narrow temperature range rather than at a specific temperature, the louver orientation may, under appropriate temperature control, be set to any position intermediate between the 'closed' and 'open' configurations shown in FIGS. 2A and 2B respectively. Other automotive devices which may employ similar position-controllable SMA actuators include rearview and/or side mirrors, visors and shades.

Figure 3A:
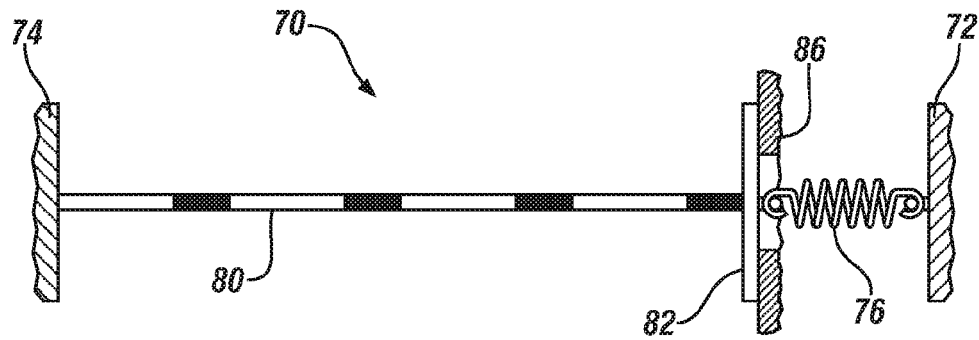
FIGS. 3A-D illustrate an operating cycle for a representative SMA wire actuator.
Figure 3B:
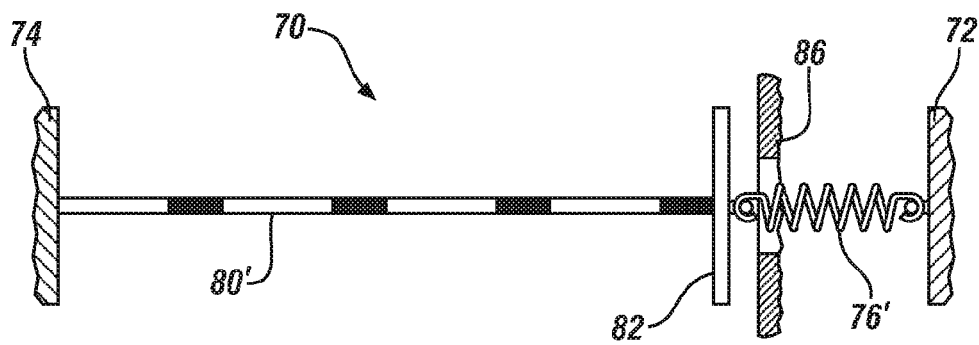
Figure 3C:
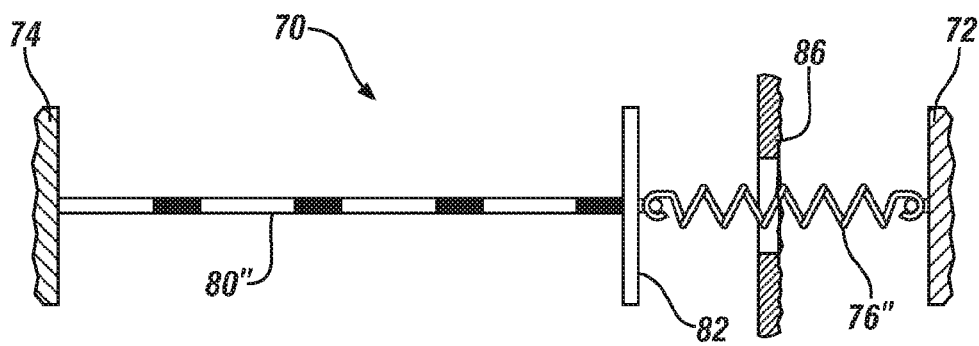
Figure 3D:
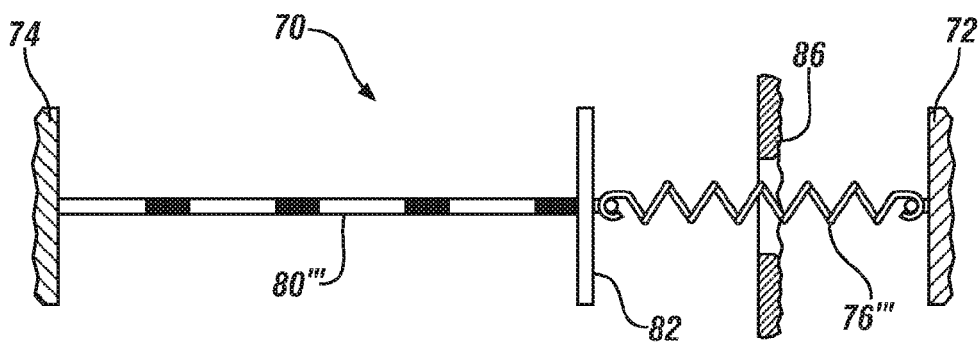

FIGS. 3A-D illustrate a representative or generic SMA actuator mechanism 70. In FIG. 3A SMA wire 80, attached at one end to fixed support 74 and at a second end to a face of disc 82, is at a temperature below its transformation temperature and so is substantially entirely in its martensite phase. In this lower strength phase, wire 80 is readily deformed by spring 76 and is extended to a maximum, predetermined length. The length is established by the separation between support 74 and stop 86, and is enforced by interference of disc 82 with stop 86. It will be appreciated that even though disc 82 contacts stop 86, wire 80 is under tension. Disc 82 is rigidly attached to wire 80 at one face and to one end of spring 76 at an opposing face. A second end of spring 76 is attached to fixed support 72. In FIG. 3B SMA wire 80' is being heated, for example by passage of electrical current along its length (electrical circuit and connections not shown) and has partially transformed to the austenite phase, partially extending spring 76'. A later stage, corresponding to further transformation and contraction of wire 80" and extension of spring 76" is shown in FIG. 3C, while the wire in its fully contracted length 80' and the fully extended spring 76''' are shown in FIG. 3D.

When heating is discontinued, wire 80' will cool, typically at a rate dictated by ambient conditions although forced cooling may be employed if rapid cooling is desired. As the wire cools it will transform, over a particular temperature range to martensite, and be deformed by spring 76 so that the actuator will revert to the configuration of FIG. 3A. With the actuator now in the configuration of FIG. 3A the process may be repeated. Ideally such contraction and extension of the SMA wire would be fully reversible so that it may be subjected any number of repeated cycles without incurring any change in properties.

In practice, some, almost imperceptible, irrecoverable deformation occurs on every cycle due to some irreversibility of the deformation mechanism(s). These irreversibilities accumulate with continued cycling, promoting a gradual increase in the length of the SMA wire and a gradual reduction the tension in wire 80, until, after some number of cycles, slack develops in the SMA wire. This is the condition represented in FIG. 4. For clarity the extension of wire 180 and its curvature between supports 74 and 82 has been exaggerated. This excess length, or slack, functions as a lost motion device, reducing the actuator stroke or requiring that the wire be heated more aggressively to develop the design stroke. However, more aggressive heating can lead to accelerated accumulation of irreversibilities and an associated accelerated loss of device function or premature material failure. In progressive operation devices, such as the louvers of FIGS. 2A and 2B, this lost motion at the beginning of the stroke renders the response of the louvers to heating highly non-linear and unpredictable. By re-tensioning wire 180, the 'lost' motion may be recovered and full device functionality maintained with a more limited stroke than was required for the untensioned wire. A number of embodiments of suitable tensioner devices are described below.

Figure 4:
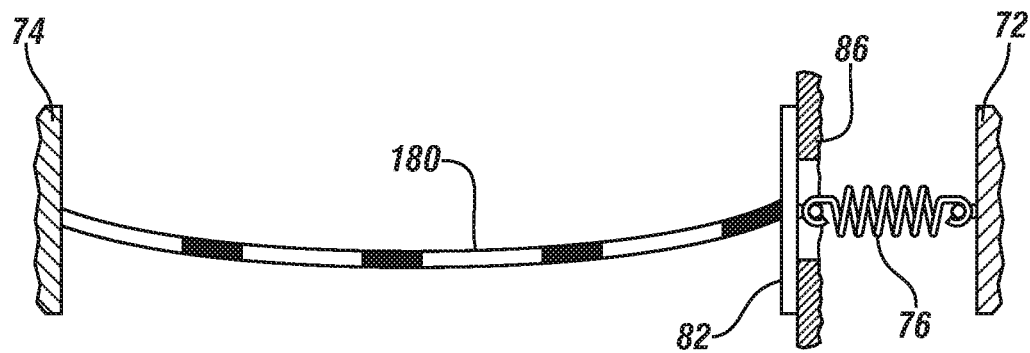
FIG. 4 shows the SMA wire geometry of the actuator shown in FIGS. 3A-D after repeated cycles.
Figure 5A:
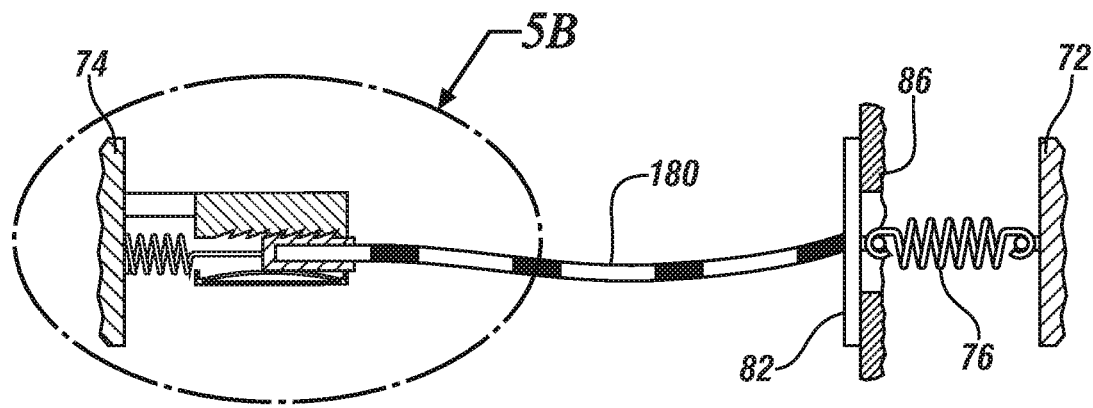
FIG. 5A shows the SMA actuator of FIG. 4 further incorporating a tensioner embodiment shown in FIG. 5B to illustrate the tensioner location relative to the other components of the actuator.

FIG. 5A shows a first embodiment of the invention, illustrating its placement relative to support 74, SMA wire 180 and the other SMA elements illustrated in FIG. 4. As will become apparent, the illustrated configuration is broadly applicable to many of the embodiments of the invention. In this first embodiment, better shown in FIG. 5B, wire 180 is crimped or otherwise secured in sleeve 90 which incorporates a rack 101, complementary to, and arranged in opposition to, rack 98, which is secured to tension spring 92. Rack 101 has teeth 100, shaped and sized to engage rack 98 of post 94. Teeth 100 are shaped to easily slide along ramp 97 of rack 98 as wire 180 is urged in the direction of arrow 102 by spring 92, but to engage with steeply sloped edges 99 when tension is applied to the wire. Thus during transformation of wire 180' from martensite to austenite, or during deformation of wire 180 by spring 76 while in its martensite form, a robust connection is established between SMA wire 180 and support 74 through post 94.

But as slack develops in wire 180 the wire may be re-tensioned under the urging of a suitable stored energy device, here shown as spring 92, which serves to advance tooth 100 along rack 98 in the direction of arrow 102. Spring 92 serves both to detect the reduced tension and to re-establish tension. To be effective spring 92 must be pre-tensioned and operate as a stored energy device. If, or when, the loss of tension in the wire is minimal, spring 92 will be passive and continue to store energy, but once a predetermined loss of tension occurs, a portion of the stored energy will be expended to re-tension the wire.

Figure 5B:
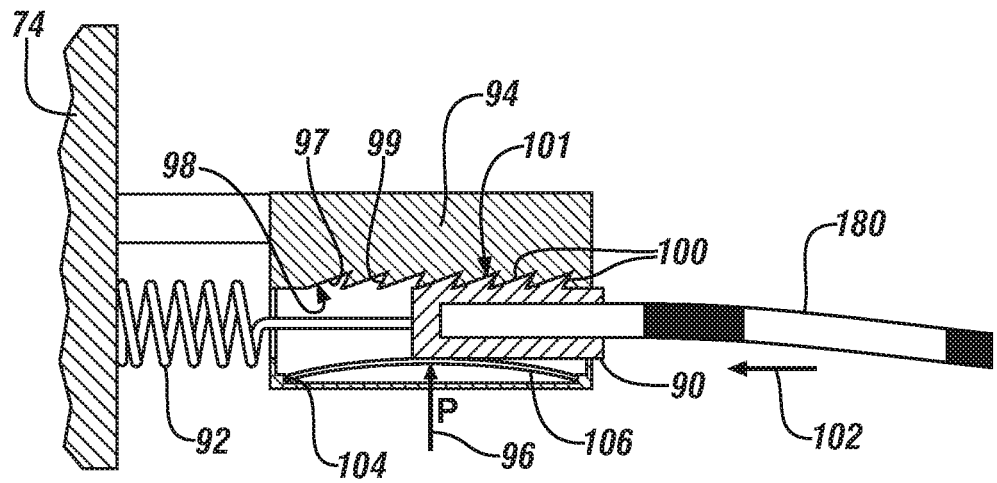
FIGS. 5B-D illustrate alternate embodiments of the invention incorporating ratchets for attaching the SMA wire to the support 74 and removing the slack developed in the SMA wire.

The stored energy device of FIGS. 5A and 5B has been represented as a coil spring under tension. Of course any device, such as an electric motor, capable of moving the different parts of the tensioner relative to one another may serve the same purpose, but a spring-based device is simple and substantially maintenance-free. It will also be appreciated that, under different tensioner configurations, a coil spring in compression, a torsion spring, a leaf spring, a clock spring, a gas spring, a wave spring, or a urethane (or other compliant polymer) compression spring may be equally or more suitable than the depicted tension spring. Also, where only a small displacement of the SMA wire end is required to re-tension the wire, such as on a small-displacement mechanism utilizing only a short length of SMA wire, a suitable spring action may be achieved using one or more spring washers such as a Belleville washer, a wave washer or a clover dome washer.

Typically spring 92 should be selected to establish a tension in wire 180 which is generally equal to the initial tension imparted by spring 76. It will be appreciated that for proper functioning, rack 98 and tooth 100 must remain engaged at all time. Suitably this may be achieved by application of modest pressure P in the direction of arrow 96. One method of applying such pressure is through leaf spring 106 supported by hollow sleeve 104. Hollow sleeve 104 allows access to rack 98 and is sized to accommodate crimp 90 while modestly flexing spring 106 which ensures consistent engagement of tooth 100 with rack 98 under all relative positions of tooth and rack. But other approaches to ensuring continued tooth engagement such as spring-loading tooth 100 may also be employed provided sleeve 104 is sized appropriately to the range of tooth motion.

Figure 5C:
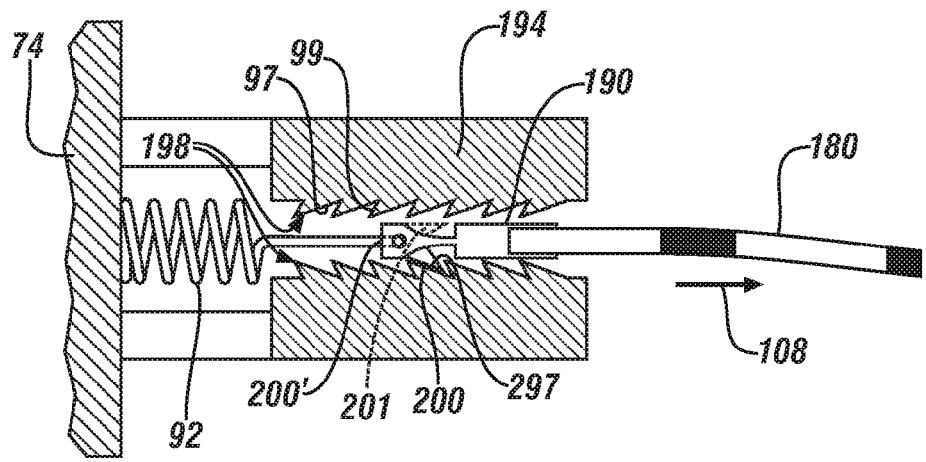
Figure 5D:
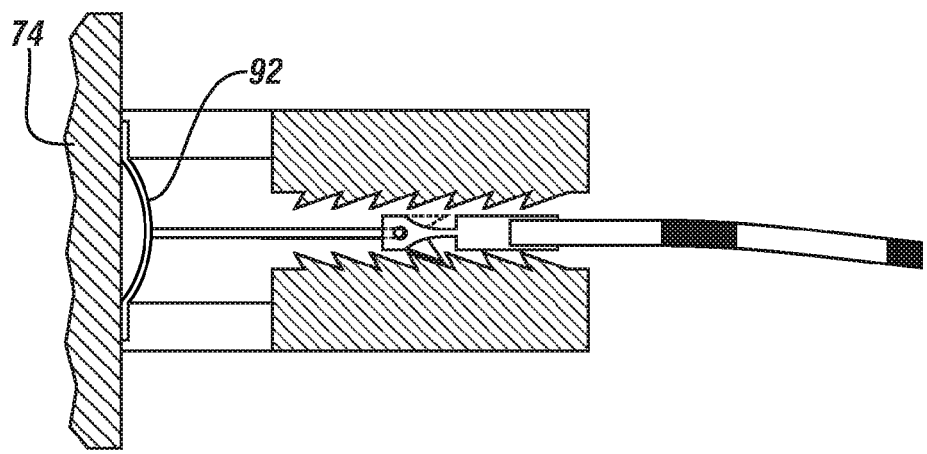

FIG. 5C illustrates a similar ratcheting rack device mounted on a post 194, here using opposing racks 198, each with ramp portion 97 and steeply sloped edge 99. Opposed teeth 200, 200' are attached to wire 180 through crimp 190 and intended to selectively engage racks 198 to impart tension to the wire. Opposed teeth 200, 200' are arranged to rotate about pivot 201 and to be spring loaded (details not shown) so that, if unopposed, they will return to their extended configuration 200 but if opposed may adopt compact configuration 200'. Thus contact between ramp 97 and the complementary surface 297 of tooth 200 will induce tooth 200 to rotate inwardly about pivot 201. When the rotation is a maximum, tooth 200 will adopt the configuration of tooth 200', shown in ghost, clearing each of opposing racks 198. Hence, if slack develops, crimp 190 may be moved toward support 74 under the urging of spring 92, tensioning wire 180, while continuing to oppose motion in the direction of arrow 108 during operation of the actuator. It will be appreciated that although spring 92 has been depicted as a coil spring other spring geometries such as leaf spring 192 shown in FIG. 5D may also be used. More generally, any means of imparting a directed force to crimp 190 to tension wire 180', including a motor, solenoid, hydraulic cylinder or others known to those skilled in the art, may be used without limitation. Also, opposed racks are shown as aligned, that is the ramps and edges of each rack are arranged opposite one another. It will be appreciated that the effective tooth pitch may be reduced by offsetting one rack from the other provided engagement of a single tooth is sufficient to resist the transformation loads. Further, whether or not the racks are aligned or offset, crimp 190 may incorporate multiple teeth 200, 200' as required to sustain the operating loads on the interacting rack and teeth.

Figure 6:
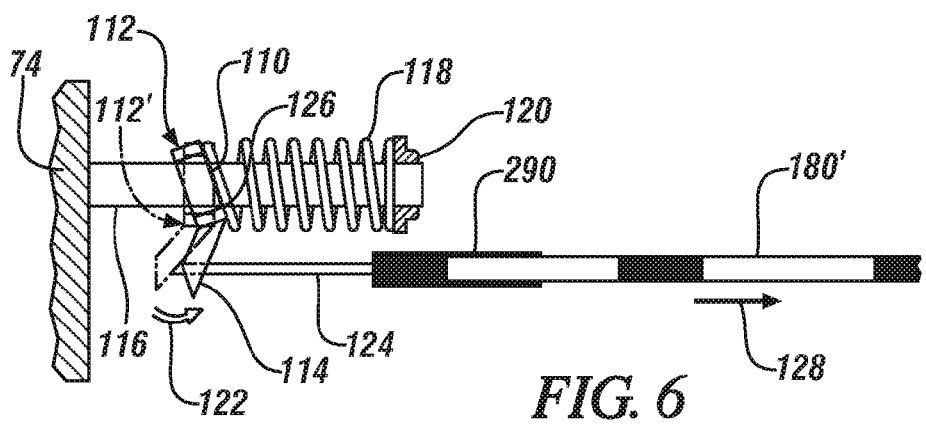
FIG. 6 shows another embodiment for removing the slack from an SMA wire incorporating a hold open washer.

FIG. 6 illustrates a second embodiment of the invention capable of continuously tensioning wire 180'. Here, a hold open washer 112 comprising washer section 110 with an opening sized to engage but slide freely on post 116, and an angled solid extension 114, is connected to crimp 290 by connector 124. Washer section 110 of hold open washer 112 is acted upon by compression spring 118 encircling post 116 and supported by stop 120. When SMA wire 180' is slack, the hold open washer will be oriented as shown in ghost at 112'. In this orientation the hold open washer may be urged along post 116 toward support 74. As it does so, it applies tension to SMA wire 180' connected to angled extension 114, rotating the hold open washer in the direction of arrow 122 to the inclined configuration shown at 112. In this configuration, edge 126 of the opening of washer section 110 engages post 116 to resist motion of washer 112 in the direction of arrow 128 in operation of the SMA device.

Figure 7:
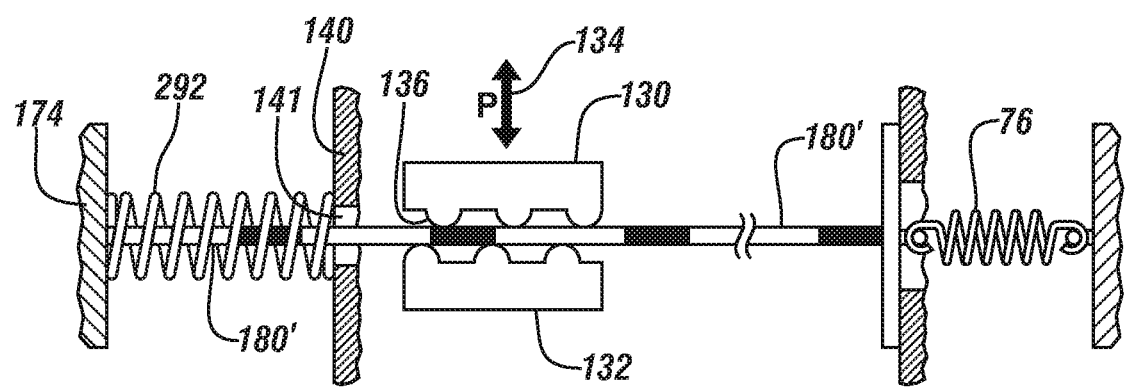
FIG. 7 shows yet another embodiment for removing slack from an SMA wire incorporating a selectively releasable clamp which may act on either the SMA wire or a crimp or similar structure rigidly attached to the SMA wire.

FIG. 7 illustrates another embodiment of the invention. In this embodiment the SMA wire is clamped between two clamps 130, 132. Clamps 130, 132 may be clamped and released by reversible motion of one or both of the clamps in the direction of arrow 134 and secured under an applied pressure P. Either or both of clamps 130, 132 may have features or protrusions, for example, and without limitation, as shown at 136, for enhancing the gripping force. The clamp may generate only a frictional restraining force, or mechanically engage the wire, for example by incorporating shaped teeth or like features which may embed themselves into the wire. The clamps may act directly on SMA wire 180', as illustrated, or on a crimp or sleeve surrounding the wire (not shown). Where mechanical engagement is intended, the clamp should engage with a crimp or sleeve, preferably made of a soft and readily deformed metal or alloy, to avoid damaging the SMA wire during the gripping process. Clamps 130, 132 are secured to support 140 (not shown) so that they may sustain the loads applied to wire 180' during phase change or during tensioning by spring 76. The attachment may not interfere with the ability of clamps 130, 132 to reversibly move relative to one another to engage and disengage SMA wire 180'. In this embodiment, an end of wire 180' is not secured to fixed support 140 but rather wire 180' passes through support 140 at opening 141 so that its end may be secured at moveable support 174.

In operation, the SMA actuator may be exercised until some predetermined slack develops in the SMA wire. Then one or both of clamps 130, 132 may be withdrawn to separate the clamps and release pressure on wire 180'. With wire 180' now released from clamps 130, 132 compression spring 292 acting against fixed support 140 displaces support 174, attached to wire 180', tensioning wire 180'. Clamps 130, 132 may then be brought into contact with the wire 180' to secure wire 180' and again render the actuator operable. Although in this embodiment tensioning was facilitated indirectly using compression spring 292 positioned between fixed support 140 and movable support 174, tensioning may also be accomplished directly using tension springs as in the arrangements of FIGS. 5B, 5C and 5D.

Figure 8:
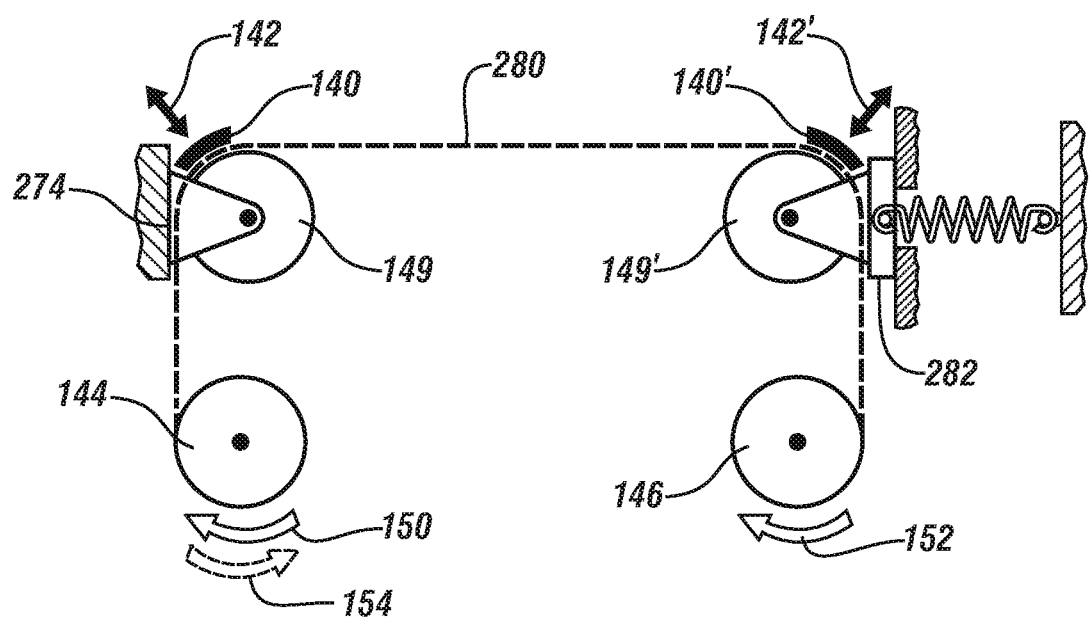
FIG. 8 shows a further embodiment for removing the slack from an SMA wire. This embodiment employs pulleys and selectively releasable clamps to grip the wire. Provision is also made for feeding wire from a spool to completely replace wire which is incapable of providing the intended design displacement.

FIG. 8 illustrates yet another embodiment of a tensioner. It will be appreciated that although re-tensioning the SMA wire may be effective in restoring device performance, such re-tensioning may not be continued indefinitely. After some number of operations, even a full and complete transformation of the wire volume to austenite may not generate sufficient displacement for satisfactory device operation. In this circumstance complete wire replacement is the only appropriate remedial action. The tensioner shown in FIG. 8 is an embodiment which both offers opportunity to tension wire 280 and also to replace active SMA wire length 280 if re-tensioning alone will not be adequate to restore device performance. A length of SMA wire 280 is fed from supply spool 144, around idler pulleys 149, 149' to take-up spool 146. In operation, wire may be withdrawn from supply spool 144 by rotation of take-up spool 146 in the direction indicated by arrow 152 after first releasing each of brake pads 140, 140' by displacing them outwardly in the direction of arrows 142, 142' respectively. Supply spool 144 is not driven but is rotated in the direction of arrow 150 by the rotation of take-up spool 146 transmitted by wire 280. After withdrawal of a suitable wire length the wire may be tensioned in one of two ways. In a first embodiment brake shoe 140, may be directed inwardly in the direction of arrow 142 to lock wire 280 against pulley 149 while continuing to power take-up spool 146 to rotate it in the direction of arrow 152. The tension in wire 280 may be determined, for example, by using an electric motor to power spool take-up spool 146 and recording motor current. When the wire tension reaches a predetermined value then brake 140' may be applied to pulley 149' by displacing it inwardly along the direction of arrow 142', locking the tensioned wire 280 between pulleys 149 and 149'. In an alternative embodiment SMA wire 80 may be tensioned by powering supply spool 144 in a direction indicated by arrow 154 while simultaneously powering take-up spool 146 in the direction of arrow 152 with both of brakes 140 and 140' released. Because the two spools are acting in opposition wire 280 is tensioned. So when a predetermined tension is achieved, both of brakes 140 and 140' may be applied generally simultaneously to maintain wire tension in the wire segment between pulleys 149 and 149'. Analogously to the actuator configuration represented in FIGS. 3A-D, pulley 149 is secured to support 274, and pulley 149' is secured to disc 282.

The configuration of FIG. 8 enables both feeding and tensioning of wire. It will be appreciated that tensioning alone may be accomplished by securing the ends of wire 280 passing around pulleys 149 and 149' to each of pulleys 149 and 149'. One or other of pulleys 149 and 149' may be powered, for example using a clock spring, to apply tension to the wire. Tension may be maintained using a pawl (not shown) adapted for engagement with a ratchet (not shown) attached to the pulley and coaxial with the pulley axis.

Figure 9:
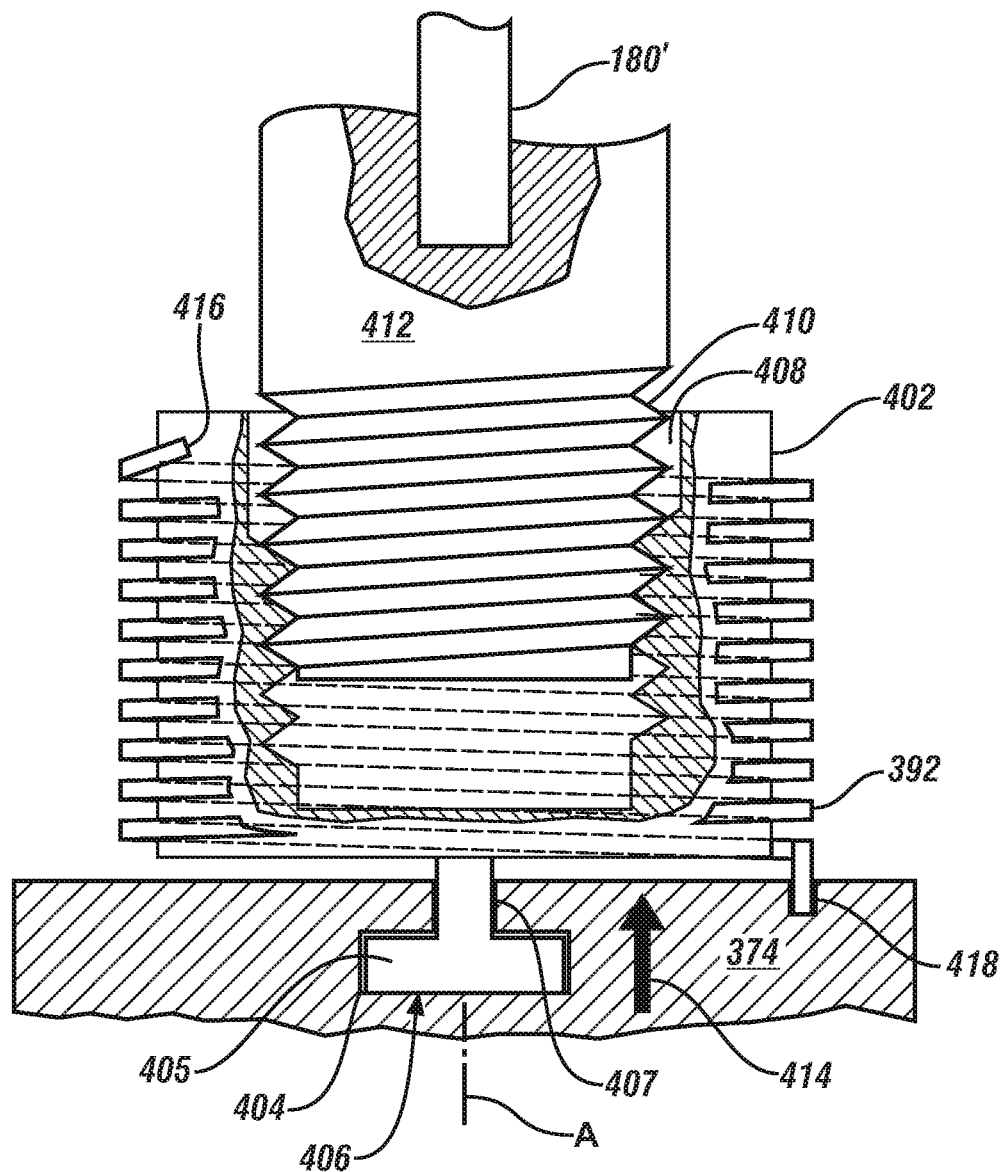
FIG. 9 shows another embodiment for removing slack employing a threaded SMA wire crimp or similar structure.

FIG. 9 shows an embodiment for tensioning wire 180' employing a helical spring 392, shown in ghost and partial cutaway for clarity, encircling a receptacle 402 with a threaded, parallel sided interior cavity 408 extending partially through the receptacle. Interior cavity 408 is sized and shaped to engage threads 410 on the exterior of generally cylindrical crimp 412 which secures SMA wire 180'. Receptacle 402 engages support 374 in a manner which prohibits motion in the direction of arrow 414 but enables rotation about axis 'A'. As shown, this is achieved by forming on the base of receptacle 402 a structure 406 comprising a shaft 407 attached to a surface of a disc 405 and locating structure 406 in a close-fitting cavity of complementary shape 404 in support 374. The dimensions of structure 406 and cavity 404 should enable rotation of receptacle 402 under the urging of helical spring 392.

Helical spring 392 is secured at one end 418 to support 374 and at a second end 416 to receptacle 402, so that, when tensioned, spring 392 may rotate receptacle 402. If threads 410 of crimp 412 engage threaded cavity 408, then rotation of receptacle 402 will draw crimp 412 into cavity 408 and tension wire 180'. In tensioning wire 180' disc 405 will be pulled into contact with a surface of cavity 404, generating a frictional force which, with appropriate choice of spring tension and thread pitch will enable a predetermined tension in wire 108' without overstressing. It will be appreciated that the particular association of the interior and exterior threads with specific components of the tensioner is illustrative and not limiting and may be reversed from that depicted without prejudice to the operation of the tensioner.

A tensioning mechanism may also employ gears. A rack and pinion device with the rack attached to a wire crimp and a driven pinion gear attached to a fixed support would enable tensioning without applying torque or torsional loads to the wire. However such a rack and pinion mechanism would require that power be maintained during operation or require the addition of a brake to avoid backdriving the pinion. A worm gear mechanism, with appropriate choice of gear parameters, may eliminate backdriving even under power-off operation. However some means of decoupling the wire from the driven gear may be necessary to avoid torquing the wire.

While preferred embodiments of the invention have been described as illustrations, these illustrations are not intended to limit the scope of the invention.

The invention claimed is:

1. An actuator for operating a device with one or more moveable components, the actuator comprising a linear Shape Memory Alloy (SMA) element with an axis and two ends, and a return spring with two ends, the SMA element having an active length and being initially taut when in a lower temperature phase;
    a first end of each of the SMA element and the return spring each being attachable to the moveable component of the device, or to an attachment adapted to engage the moveable component of the device, the second end of the return spring being attachable to a fixed support, the SMA element, return spring and moveable component or attachment being arranged so that the return spring tensions the SMA wire;
    the SMA element being adapted to shorten, and thereby extend the return spring to displace the moveable component, or the attachment, from an initial configuration and operate the device when the SMA element is heated and adopts a higher temperature phase, the SMA element being adapted to be deformed and lengthened by the return spring when the SMA element is cooled and adopts the lower temperature phase;
    the actuator also comprising a stop, the stop limiting the lengthening of the SMA element by the return spring to enforce a predetermined lengthening of the SMA element when the element is in its lower temperature phase, the predetermined lengthening of the SMA element being selected to return the moveable component, or the attachment, to its initial configuration and ready the device for further operation, the SMA element progressively lengthening under repeated use so that the SMA element develops slack and loses its initial tautness when in its lower temperature phase;
    the actuator further comprising a tensioner for minimizing developed slack in the SMA element and maintaining the tautness of the SMA element, the tensioner having two inter-engaging parts, a moveable part attached to the second end of the SMA element, the moveable part engaging a tensioning spring which engages a stationary part of the tensioner secured to a support, the stationary part being spaced apart from the moveable part along the axis of the SMA element, the tensioning spring and the tensioner parts being arranged so that the tensioning spring acts to displace the moveable part, and the second end of the SMA element, along the SMA element axis and extend the SMA element to remove slack in the SMA element and restore the SMA element to its initially-taut configuration when the SMA element is in its low temperature phase; and,
    the stationary and moveable parts of the tensioner each having mutually-engageable features adapted to secure the moveable part to the stationary part and oppose any relative motion of the stationary and moveable parts of the tensioner in a direction which might produce slack in the SMA element while enabling repeated relative motion of the moveable and stationary parts in a direction for removing slack in the SMA element.

2. The SMA actuator of claim 1 in which the tensioning spring is one of a coil spring, a leaf spring, a polymer compression spring, a clock spring and a gas spring.

3. The SMA actuator of claim 1 in which the stationary part of the tensioner comprises a first toothed rack and the moveable part comprises a second toothed rack of complementary geometry.

4. The SMA actuator of claim 1 in which the stationary part of the tensioner comprises a toothed rack, and the end moveable part comprises at least a pivoting tooth.

5. The SMA actuator of claim 1 in which the first stationary part of the tensioner comprises a shaft with an axis and the second moveable part comprises a hold open washer comprising a washer section with an opening, the opening being sized to slide freely on the shaft when the washer is generally perpendicular to the shaft axis, and to engage the shaft when the washer is inclined to the shaft axis, the washer further comprising an outwardly-angled section for attachment to the SMA element.

6. The SMA actuator of claim 1 in which the first stationary part of the tensioner comprises an elongated threaded member with an axis and having a first continuous helical thread disposed about its axis, the stationary part being free to rotate about its axis but restrained against motion along its axis by engagement with a support, the moveable part having a second helical thread, complementary to the first thread, the stationary and moveable parts being threadably engaged, the stationary part being torqued by a pre-tensioned torsional spring.

7. The SMA actuator of claim 1 in which the stationary part of the tensioner comprises an elongated threaded member with an axis and having a first continuous helical thread disposed about its axis, the stationary part being free to rotate about its axis but restrained against motion along its axis by engagement with a support, the moveable part having a second helical thread, complementary to the first thread, the stationary and moveable parts being threadably engaged, the moveable part being torqued by a pre-tensioned torsional spring.

8. An SMA-actuated device incorporating one or more moveable components and an SMA actuator, the actuator comprising a linear Shape Memory Alloy (SMA) element with an axis and an active length, and a return spring, each of the SMA element and the return spring having two ends;
one end of each of the SMA element and the return spring being attached to the moveable component of the device, or to an attachment adapted for engagement with the moveable component of the device, the SMA element, return spring, and moveable component, or attachment, being arranged so that the SMA wire is tensioned by the return spring;
the SMA element being adapted to shorten and thereby extend the return spring to displace the moveable component, or the attachment, from an initial configuration and operate the device when the SMA element is in a higher temperature phase, the SMA element being adapted to be deformed and stretched by a predetermined return distance by the return spring when in a lower temperature phase to return the moveable component, or the attachment, to its initial configuration and ready the device for further operation;
the actuator also comprising a stop, the stop enforcing the predetermined return distance to develop a predetermined extension in the SMA element when the element is in its lower temperature phase, the active length of the SMA element, initially taut when in its lower temperature phase, progressively extending and developing slack under repeated use;
the actuator further comprising a tensioner for maintaining the tautness of the active length of the SMA element as the SMA element develops slack under repeated use, the tensioner having two parts, a stationary part attached to a fixed support, and a moveable part, spaced apart from the stationary part along the SMA element axis and attached to the second end of the SMA element, the stationary and moveable parts of the tensioner each being spring-loaded by a tensioning spring, the tensioning spring and the tensioner parts being arranged so that the tensioning spring acts to displace the moveable part by a distance sufficient to remove the slack in the SMA element so as to repeatedly restore the SMA element to its initially-taut configuration during extended use; and, the stationary and moveable parts of the tensioner having mutually-engageable features adapted to maintain the SMA element in its tautened configuration during subsequent operation of the device.

9. A device incorporating the SMA actuator of claim 8 in which the tensioning spring is one of a coil spring, a leaf spring, a polymer compression spring and a gas spring.

10. The device recited in claim 8 in which the SMA actuator is cycled between a first position and a second position.

11. The device recited in claim 10 in which the device is one of the group consisting of a retractable air dam, a latch and a clutch.

12. The device recited in claim 8 in which the SMA actuator may adopt any of a range of positions between a first position and a second position.

13. The device recited in claim 12 in which the device is one of the group consisting of an adjustable louver array, a fluid flow valve, a rearview mirror, a side mirror and a sun visor.

14. A tensioner for eliminating slack in an active length of linear shape memory alloy (SMA) element used in an SMA actuator, the active length of the SMA element having two ends, the active length of the SMA element being initially taut when in a lower temperature phase, but progressively lengthening, and thereby developing slack and loss of tautness in the active length, when in the lower temperature phase during continuing use, the tensioner comprising:
a moveable part engaging the SMA element, a fixed part, and a tensioning spring engaging the moveable part;
the fixed part being secured to a fixed support and engaging either, the SMA element or the moveable part, to establish an end of the active length;
the moveable part, under the urging of the tensioning spring, being moveable in a direction to take up any slack in the SMA element;
the moveable part and the fixed part cooperating to eliminate slack in the SMA element when in its lower temperature phase while maintaining the locations of the ends of the active length of the SMA element during operation of the actuator as the SMA element is first heated to adopt a higher temperature phase and then cooled to again adopt the lower temperature phase.

15. The tensioner of claim 14 in which the fixed part comprises a releasable clamp for engaging and securing the taut SMA element.

16. The tensioner of claim 14 in which the moveable part comprises a pulley with a ratchet and a pawl, the pulley supporting and securing the SMA element, the pulley being secured to a support.

17. The tensioner of claim 14 in which one of the parts is a toothed rack.

18. The SMA actuator of claim 14 in which the first part of the tensioner comprises a shaft with an axis and the second part comprises a hold open washer comprising a washer section with an opening, the opening being sized to slide freely on the shaft when the washer is generally perpendicular to the shaft axis, and to engage the shaft when the washer is inclined to the shaft axis, the washer further comprising an outwardly-angled section for attachment to the SMA element.

19. The tensioner of claim 14 in which the moveable and fixed parts mutually engage.

20. The tensioner of claim 19 comprising an elongated, threaded member moveable part with an axis and having a first continuous helical thread disposed about its axis, the moveable part being free to rotate about its axis but restrained against motion along its axis by threadable engagement with a fixed part having a second helical thread, complementary to the first thread, the second part being torqued by a pre-tensioned torsional spring.

* * * * *